United States Patent [19]

Plunkett et al.

[11] 3,916,275

[45] Oct. 28, 1975

[54] ACCURATE MOTOR SLIP CONTROL SYSTEM WITH SPEED RATE LIMITED

[75] Inventors: Allan Barr Plunkett; Thomas Detlor Stitt, both of Erie, Pa.

[73] Assignee: General Electric Co., Erie, Pa.

[22] Filed: Oct. 10, 1974

[21] Appl. No.: 513,831

[52] U.S. Cl............................ 318/231; 318/231 X
[51] Int. Cl.² ...................................... H02P 7/42
[58] Field of Search...................... 318/227, 230, 231

[56] References Cited
UNITED STATES PATENTS

| | | | |
|---|---|---|---|
| 3,372,323 | 3/1968 | Guyeska | 318/231 X |
| 3,593,083 | 7/1971 | Blaschke | 318/227 |
| 3,619,750 | 11/1971 | Mokrytzki | 318/231 |

Primary Examiner—G. Z. Rubinson
Attorney, Agent, or Firm—Walter C. Bernkopf; Dana F. Bigelow

[57] ABSTRACT

The accurate digital tachometer signal from an inverter drive motor is converted to an analog level, filtered and summed with a desired slip frequency signal and then compared with the summation of the unfiltered tachometer signal and the slip frequency signal. The resulting error signal is filtered and applied to the filtered summation to obtain an accurate stator frequency signal. In this way motor acceleration resulting from wheel slip is limited but the system is allowed to respond immediately to changes in the desired slip frequency signal.

15 Claims, 5 Drawing Figures

ACCURATE MOTOR SLIP CONTROL SYSTEM WITH SPEED RATE LIMITED

BACKGROUND OF THE INVENTION

This invention relates generally to induction motor control systems and more particularly to slip control systems for induction motor propulsion drive systems.

Speed control of electric drive propulsion systems such as those used in rail transit cars has traditionally been maintained by the selective modulation of the torque level produced by the motor. In the case of d-c motors it is a relatively simple matter to modulate the motor armature current to obtain the desired speeds. However, in the use of a-c motors the problem becomes somewhat more complicated in that the speed and the torque output of the motor is determined in part by the frequency of the power being delivered to it. It is the control of this stator frequency with which we are concerned in the present invention.

The present invention is generally applicable to induction motor control circuits which derive a stator frequency control signal from the summation of a motor shaft speed signal and the desired slip frequency signal, and is particularly applicable to the control of inverter propulsion circuits of the type shown and described in copending U.S. patent application Ser. No. 402,253, entitled "Method and Apparatus for Automatic IR Compensation" applied for on Oct. 1, 1973 by A. B. Plunkett and assigned to the assignee of the present invention. While the present invention is to be described with respect to a control circuit as is taught by that copending application it is to be expressly understood that the invention is not to be so limited.

In control circuits of this type the frequency of the inverter output as it is applied to the inductioin motor is determined by the stator frequency signal which in turn is a function of the summation of motor shaft speed and the desired slip frequency. The slip frequency is added for motoring operation and subtracted for the braking mode of operation. In order to maintain the desired degree of control of the inverter output it is necessary that changes in slip frequency be followed by fast response changes in the inverter, or said in another way, the system must be relatively sensitive to changes in slip frequency signals in order to maintain a desired high degree of control.

Normally, in the interests of accuracy the shaft speed signal is derived by the use of a digital tachometer since small errors in speed would cause significant errors in the stator frequency signal and hence in the desired torque output. However, in the event of a wheel slip condition as is common on rail traction vehicles, the shaft speed tends to increase rapidly, and instead of the torque falling off, as would be the desired reaction, there would be a tendency for the system to maintain the commanded torque and the motor will accelerate. To prevent this reaction the shaft speed signal can be filtered to limit the rate of change seen by the summing device. However, in order to effect this rate limiting function, it is first necessary to change the digital signal to an analog signal, and subsequently to change the analog signal back to the digital form. These conversion functions tend to introduce a significant error into the system, thereby resulting in the sacrifice of stator frequency accuracy and hence that of the torque output level.

It is therefore an object of this invention to provide a traction motor slip control system whose effectiveness is not significantly reduced by the occurrence of wheel slip.

Another object of this invention is the provision for a high degree of accuracy in the torque control of a propulsion system.

Yet another object of this invention is the provision in a slip control system for rate limiting a motor shaft speed signal without attendant degradation of accuracy in the system.

Still another object of this invention is the provision in a propulsion torque control system for sensitive response to changes in slip frequency demands and delayed response to changes in actual motor shaft speeds.

A further object of this invention is the provision for a motor frequency control system which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, the motor shaft speed is represented by an accurate digital signal which is filtered to limit the rate of change caused by wheel slip. The filtered output is summed with a signal representative of the desired slip frequency to obtain an inaccurate stator frequency signal. At the same time the unfiltered digital shaft speed signal is summed with the digital slip frequency signal and the summation is compared with the inaccurate stator frequency to produce an error signal which in turn is added to the inaccurate stator frequency signal to provide an accurate stator frequency signal for motor frequency and torque control. In this way the system is made to be highly responsive to changes in slip frequency demands, while not reacting immediately to wheel slips by maintaining sonstant torque output. Application of the error correction ensures a desired accuracy of the system.

In the drawings as hereinafter described, a preferred embodiment and modified embodiment is shown; however, various other modifications and alternate constructions can be made thereto without departing from the true spirit and scope of the invention.

DESCRIPTION OF THE PREFERRED EMBODIMENT

Figure 1:
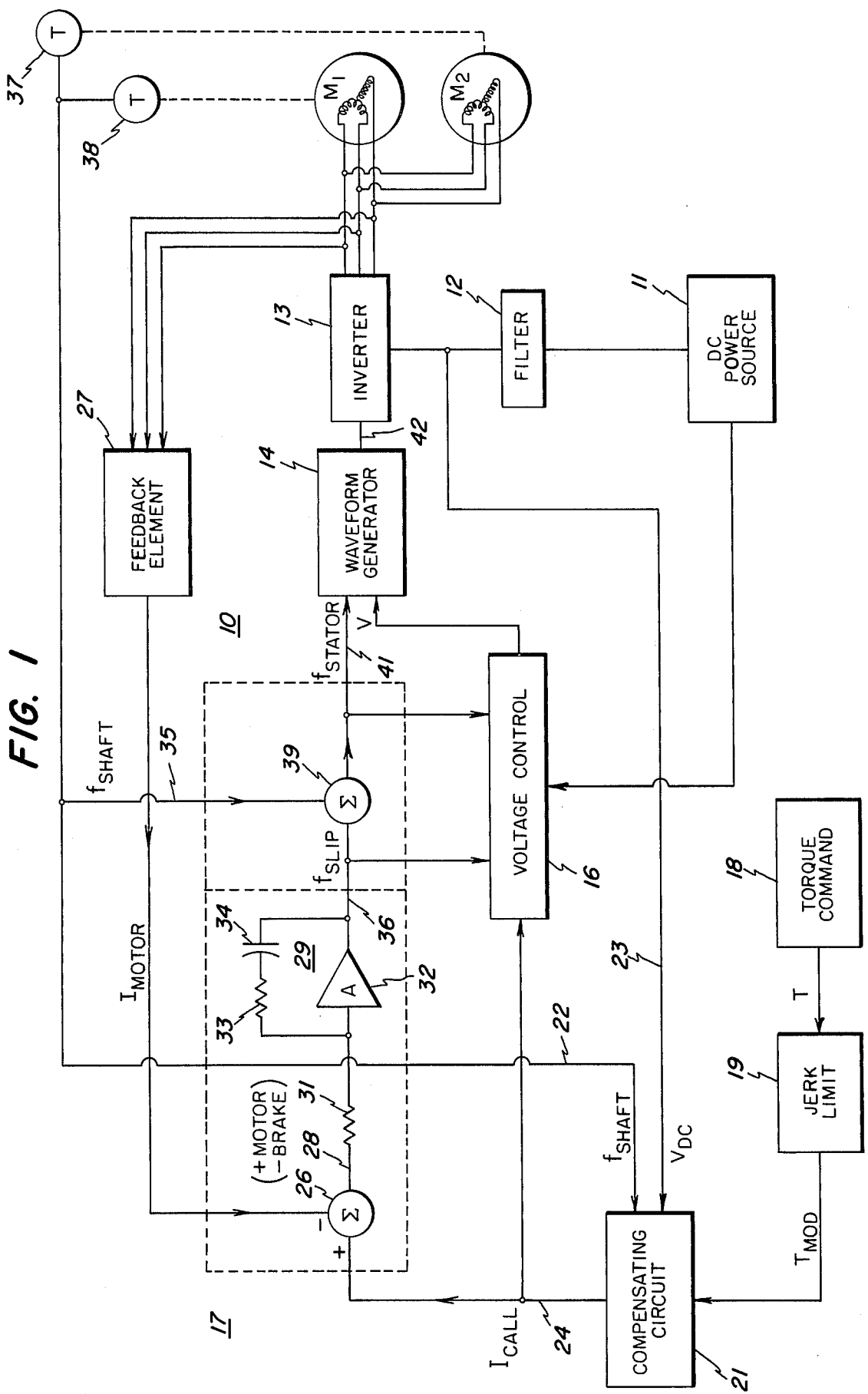
FIG. 1 is a schematic illustration of the propulsion circuitry with which the preferred embodiment is generally associated.

Referring now to FIG. 1, the slip control circuit of the present invention is indicated generally at 10 and forms part of the power control circuitry of a typical propulsion system having a pair of a-c induction motors $M_1$ and $M_2$ which provide motive power during motoring modes of operation and which act as generators during dynamic braking or regenerative braking modes of operation.

Power to the three-phase a-c induction motors $M_1$ and $M_2$ is provided by a d-c power source 11 through a low pass line filter 12 and an inverter 13. The d-c power source is typically a third rail fed from substations supplying substantially constant d-c voltage with variable transients. The line filter 12 is utilized to minimize interference with any signalling system and to supply the reactive power required for a-c induction motor excitation.

It should be understood that this invention is also applicable for use with a cycloconverter operating from an a-c source. In such a circuit the d-c power source 11, filter 12, and inverter 13 are replaced by an a-c source and a cycloconverter, with the remaining portion of the circuit operating in a manner substantially the same as with the inverter.

The inverter 13 utilizes solid state components to produce variable frequency, variable voltage, three-phase power from the d-c source to supply motors $M_1$ and $M_2$ for variable speed operation. In order to obtain the desired torque output values, as well as compensate for line voltage changes, load changes, and voltage drop in the cables, inverter and line filter, it is necessary to vary the voltage, the frequency, or both. Control of the inverter to obtain the desired frequency and voltage is thus established by a waveform generator 14 having inputs of desired stator frequency $f_{stator}$ from the slip control circuit 10, and a desired voltage V, from a voltage control circuit 16 of the type shown and descirbed in copending patent application Ser. No. 402,253 referenced hereinbefore. The waveform generator is generally of the well-known type shown and described in Operational Amplifiers, Design and Application, Tobey, Graeme and Huelsman, McGraw-Hill, 1971. The output thereof is preferably a sine wave whose amplitude is determined by the input signal V, and whose frequency is determined by the input signal $f_{stator}$. However, various other waveforms may be generated, as for example, square or sawtooth waves.

The slip control circuit 10, which will be described more full hereinafter, has as one of its inputs the motor slip frequency, $f_{slip}$, which is adjusted by a current control circuit 17 to the value required for the desired motor current and hence tractive effort level. Initially a torque command module 18 is selectively adjusted to provide a torque command signal T representative of the desired motor torque to be applied for either motoring ro braking. A jerk limit circuit 19 may be included to automatically limit the rate of change of the torque command signal T to a value consistent with passenger comfort. The resultant modified torque comman signal $T_{mod}$ is then received by the compensating circuit 21 whose other inputs include shaft speed frequency, $f_{shaft}$, and inverter d-c voltage, $V_{dc}$, along lines 22 and 23 respectively. A compensated torque command signal $I_{call}$, is then produced as an output on line 24 as shown and described in copending patent application Ser. No. 436,341 entitled "Braking Effort Control" filed on Feb. 25, 1974, in the name of Allan B. Plunkett and assigned to the assignee of the present invention. The $I_{call}$ signal is a positive signal when operating in a motoring mode and a negative signal when operating in a braking mode. It is used as an input signal into the current control circuit 17 and the voltage control circuit 16 in a manner more fully described in the copending patent applications referenced hereinbefore.

Referring now to the current control circuit 27 the compensated torque command signal $I_{call}$ is received in a summer 16 along with a d-c feedback signal $I_{motor}$, which is proportional to actual motor current. The signal $I_{motor}$ is fed back from the motor current lines through a feedback element 27 which converts the three motor a-c line currents into the d-c feedback current $I_{motor}$ in a manner more fully discussed in copending patent application Ser. No. 402,253 referenced hereinbefore. At the summer 26 the $I_{call}$ signal is compared with the $I_{motor}$ signal and the difference is sent along line 28 to an integrator 29, which comprises an input resistor 31, an operational amplifier 32 and feedback elements resistor 33 and capacitor 34. The loop compensation in the integrator 29 is of the form (S+W)/S, with the pole at the origin giving a zero steady state error and the zero (S+W) allowing a faster loop response for a given damping ratio. The output of the integrator 29 is the desired slip frequency signal which is adjusted to the value required for the desired motor current and torque. This signal is converted to a digital signal $f_{slip}$ by appropriate means (not shown) and impressed on line 36 to the slip control circuit 10 as a positive signal when operating in the motoring mode and as a negative signal when in the braking mode of operation.

The other signal which is applied to the slip control circuit is that representing the motor shaft speed $f_{shaft}$ which is fed back along line 35 from the motors through the tachometers 37 and 38. In the interest of accuracy, digital tachometers are used for the speed sensing function. In the slip control circuit a summing circuit 39 adds the input signals of the desired slip frequency $f_{slip}$ and the actual shaft frequency $f_{shaft}$ to set the terminal frequency of the a-c induction motor. The desired frequency signal $f_{stator}$ is thus derived by reading the shaft speed and adding (for motoring) or subtracting (for braking) the desired slip frequency $f_{slip}$ from the rotor frequency $f_{shaft}$, and is then passed along line 41 to the waveform generator whose output is responsively sent along line 42 to control the inverter 13.

Figure 2:
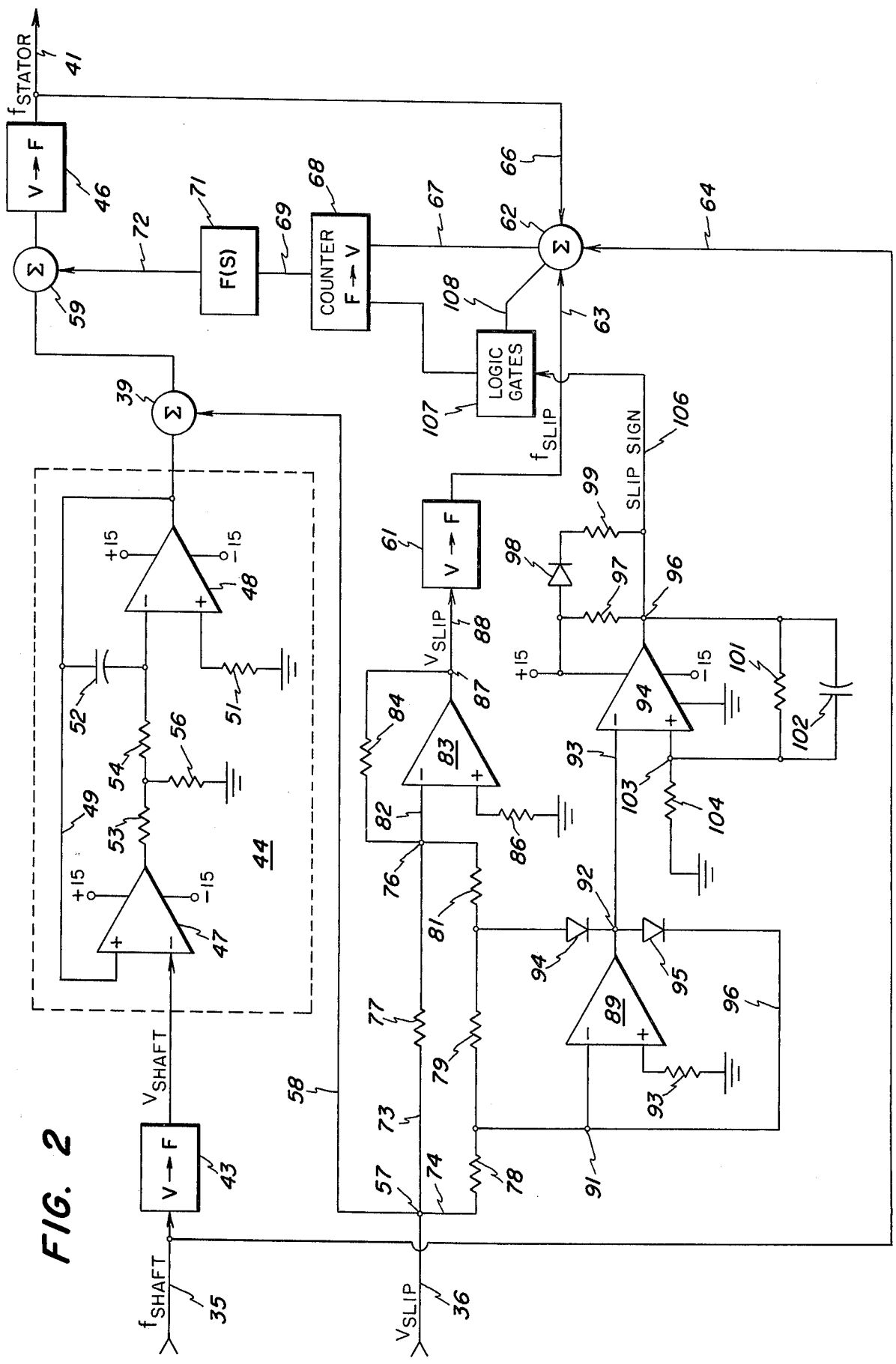
FIG. 2 is a schematic diagram of the slip control circuit portion of the preferred embodiment of the invention.

Referring now to FIG. 2, a modified slip control circuit is shown wherein again a shaft speed signal $f_{shaft}$ is transmitted along line 35 through circuits 43 and 44 to the summing circuit 39 where an analog slip frequency signal $V_{slip}$ from line 36 is added to provide a stator frequency signal $f_{stator}$ to line 41. Additional elements serially connected in the circuit between line 35 and the summing circuit 39 include a frequency to voltage converter 43, a rate limiting circuit 44, and a voltage to frequency converter 46. The converters 43 and 46 are known in the art and are of the type shown and described in Burr-Brown, "Operational Amplifiers, Design and Applications," Graeme, Tobey, Huelsman, McGraw-Hill, 1971. The rate limiting circuit 44 is basically an error amplifier driving an integrator and comprises a pair of cascade operational amplifiers 47 and 48 each having an inverse input and a positive and negative power source connected thereto. A negative feedback loop 49 is provided between the output of amplifier 48 and the input of amplifier 47. Amplifier 48 is connected to ground through a resistor 51 and has a capacitor 52 connected thereacross which acts as an integrator. Connected between the amplifiers 47 and 48 is a voltage divider network comprising the resistors 53 and 54 connected in series with their junction connected to ground through a resistor 56. This resistor network acts to adjust the amplitude of the signal to the amplifier 48 and also provides a reference to ground for the capacitor 52.

The summing circuit 39 comprises a summing amplifier of a well-known type which sums the analog slip frequency signal $V_{slip}$ from junction 57 and line 58 with the rate limited analog signal $V_{shaft}$ to provide a stator frequency signal which is converted to the digital form $f_{stator}$ by the converter 46.

It will occur to one skilled in the art that although the acceleration rate of the system is limited by limiting the rate of change of the $f_{shaft}$ signal, significant error has been introduced to the $f_{stator}$ signal by the converters 43 and 46. Since the system is intended for use with low slip induction motors this error is considered to be critical in the proper control of motor torque output. Accordingly, it is the design of the remaining portion of the circuit to calculate what the error is and to correct the $f_{stator}$ signal by the summation therewith of an error correction signal at the summing circuit 59 which again is a commonly known summing amplifier circuit.

Briefly, the error correction is accomplished as follows. The analog slip frequency signal $V_{slip}$ is first converted by a voltage-to-frequency converter 61 to a digital signal $f_{slip}$ which in turn is added (or subtracted in the case of braking) to the accurate digital shaft frequency $f_{shaft}$ to arrive at an accurate digital stator frequency. The converter 61 is simply an oscillator which generates a frequency output proportional to input voltage as described in Burr-Brown, referenced hereinbefore. The summing function is performed by a summing circuit 62 which receives the $f_{slip}$ signal along line 63 and the $f_{shaft}$ signal along line 64. The summing circuit 62 also receives the final $f_{stator}$ signal along line 66 and compares it with the accurate digital shaft frequency and slip frequency to arrive at an error signal which is transmitted along line 67 to a counter 68 which converts it to an analog signal. The analog signal from the counter passes along line 69 to a filter 71 where it is filtered and transmitted along line 72 to be applied to the rate limited signal by the summing circuit 59. A more detailed description will be given hereinafter on the summing circuit 62 and those elements between the summing circuit 62 and the summing circuit 59.

Referring now to that portion of the circuit of FIG. 2 between line 36 where the analog signal $V_{slip}$ comes in and the summing circuit 62 where it is summed with the accurate digital signal $f_{shaft}$, a pair of lines 73 and 74 are connected in parallel between the junction 57 and a junction 76, line 73 having a resistance 77 and line 74 having resistances 78, 79, and 81. Connected to the junction 76 is the input line 82 to an operational amplifier 83 having a feedback resistor 84. Its output terminal 87 is connected to the converter 61 by line 88 which transmits the absolute value of the slip, $|V_{slip}|$ thereto as will be shown hereinafter.

Connected across the resistor 79 is an operational amplifier 89 having inverting input terminal 91, output terminal 92, and ground resistor 93. In series between the gain setting resistor 79 and the output junction 92 is a diode 94 with its cathode connected to the junction 94. A second diode 95 is connected in a loop 96 between the output and the input junction 92 and 91, the diode having its anode connected to the output junction 92. Coupled to the output junction 92 is an inverted input terminal 93 of an operational amplifier 94 having ground resistor 104 and having positive and negative power sources. Coupled between the output terminal 96 and the positive power source is a clamping circuit comprising parallel loops with a resistor 97 in one and a diode 98 and resistor 99 in the other. Its function is to clamp the output terminal to the positive power source, for example 15 volts, whenever the output of the operational amplifier 94 is positive and allow it to go to zero whenever the output is negative. A feedback filter comprising a resistor 101 and capacitor 102 is connected in parallel between the output terminal 96 and the positive input terminal 103 which is grounded through resistor 104.

In operation the circuit operates as follows. When a positive voltage appears on line 36, as occurs when in the motoring mode of operation, a negative output is seen at the operational amplifier terminal 92 and diode 94 conducts. The values of resistances are such that the gain at resistor 81 is twice that at resistor 77 and therefore the lower circuit dominates. Accordingly, the negative voltage appearing on input line 82 and the positive voltage appearing at terminal 87 will be equal to the voltage at junction 57. At the same time the negative voltage at terminal 92 will give a positive voltage at terminal 96 which is increased to the value of the positive source, +15V, by the high gain of amplifier 94. This signal goes along line 106 to logic gates 107 to generate a digital signal which is transmitted to the counter 68, thereby directing it to count in one of two directions. The summer 62 also provides inputs to the logic gates 107 by way of line 108.

Assume now that a negative signal appears on line 36, as would occur during dynamic braking operation. Output terminal 92 goes positive, diode 94 is off, and there is no current flow through resistor 81. The negative signal on line 73 then appears as a positive signal at terminal 87. In the lower circuit the positive voltage condition at terminal 92 causes terminal 96 to go negative and hence to ground. The zero voltage signal is then transmitted to the logic gates 107 to generate a digital signal which directs the counter to count in the other direction.

Figure 3:
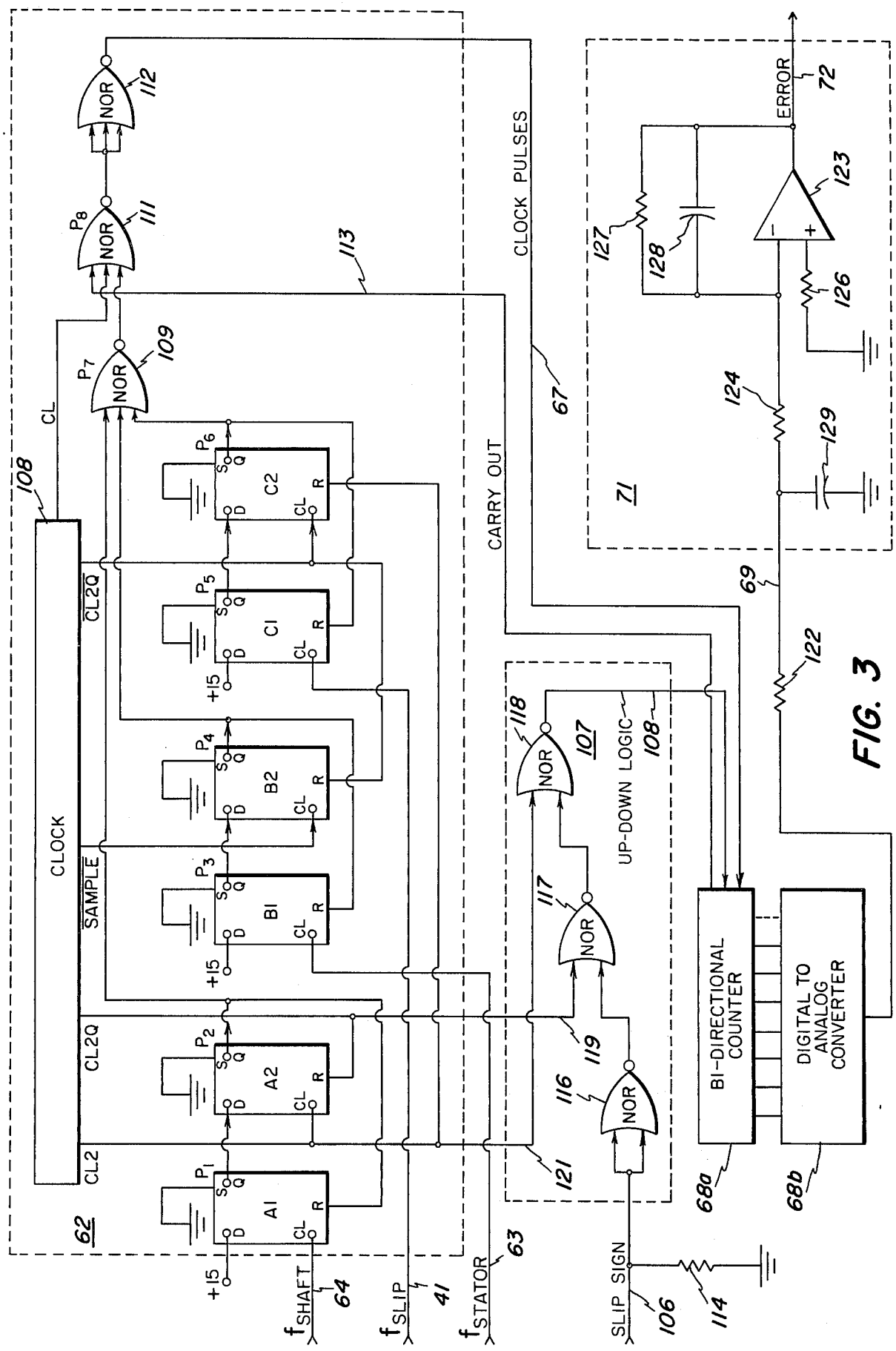
FIG. 3 is a schematic illustration of the summing and error derivation portion of the preferred embodiment of the invention.

Referring now to FIG. 3, the circuitry shown in greater detail includes the summing circuit 62, the counter 68a, the converter 68b, and the filter 71. The summing circuit 62 having digital inputs of $f_{shaft}$, $f_{stator}$, and $f_{slip}$ comprises a standard multiphase clock 108 which provides clocking pulses to a plurality of synchronizing circuit A, B, and C, with each synchronizing circuit comprising a pair of D-type flip-flops connected in cascade, the flip-flops being designated by A1 and A2, B1 and B2, and C1 and C2, respectively. The outputs of the synchronizing circuits are fed to logic circuitry comprising NOR gates 109, 111, 112, with the resultant clock impulses being transmitted along line 67 through the counter 68a.

Each of the D-type flip-flops A1 through C2 is of a standard design having a data terminal D, a clock terminal CL, and output terminal Q, a reset terminal R and a set terminal S. Each of the set terminals is tied to ground, and each of the flip-flops A1, B1 and C1 has its data terminal tied to a positive source (i.e., +15 volts). The digital signals $f_{shaft}$, $f_{stator}$, and $f_{slip}$ are fed in as clocking pulses to the flip-flops A1, B1, and C1 respectively and the signals CL2, SAMPLE and CL2Q provide the timing pulse to the clock terminals, CL, of flip-flops A2, B2, and C2, respectively. The signal CL2Q is provided to reset the flip-flop A2 whereas signal CL2 resets flip-flop C2, and signal CL2Q resets flip-flop B2. Flip-flops A1, B1, and C1 are each reset by the output signal from its respective associated flip-flop. This is to say A1 is reset by the output signal from A2, B1 is reset by the output signal from B2, and C1 is reset by the output signal from C2.

Figure 4:
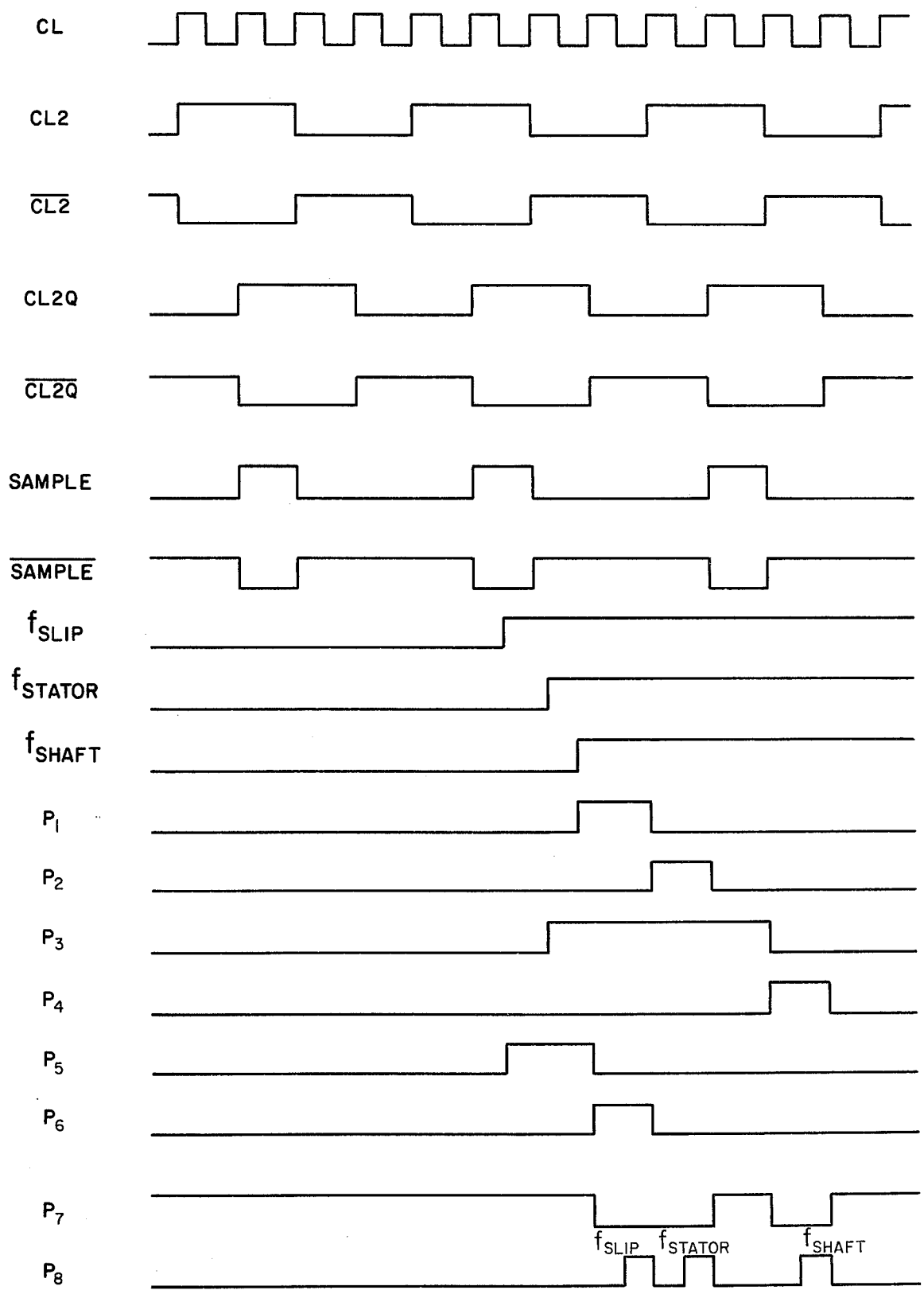
FIG. 4 is a graphic illustration of typical waveforms which occur in the apparatus of FIG. 3.

The waveforms which are associated with the signals in the circuitry of FIG. 3 are illustrated in FIG. 4. Representing the signal passing to the NOR gate 111 in FIG. 3 is a basic square wave CL, and following that are the waveforms from the clock which provide the clocking pulses to the flip-flops. The digital signals $f_{slip}$, $f_{stator}$, and $f_{shaft}$, are generally of a much lower frequency as indicated, and the pulses may appear at any time in the cycle and in any relative sequence. For illustrative purposes they are shown in close uniform sequence; however, it should be recognized that they may be relatively widely spaced or they may occur at the same time. It is the function of the clocked synchronizing circuits to separate the signals so that they can be counted by the logic circuitry.

In the lower portion of FIG. 4 are shown the waveform outputs P of the flip-flops as they are generated in relation to the clocking pulse and the digital signals to be summed. When the $f_{shaft}$ signal pulses, the state at the output terminal Q changes to an output signal $P_1$, which in turn is transmitted to terminals D and Q of flip-flop A2 when CL2 is pulsed as shown. The signal P2 then appears to reset flip-flop A1 as well as to be transmitted to the NOR gate 109. The signal P2 stays pulsed until the flip-flop A2 is reset by the signal CL2Q. Similarly, when the $f_{stator}$ signal provides a clocking pulse to the flip-flop B1, the signal P3 appears at its terminal Q, and upon the appearance of a clocking pulse from the signal sample, the signal P4 is transmitted to the NOR gate 109 and to reset the flip-flop B1. The signal P4 stays pulsed until the flip-flop B2 is reset by the signal CL2Q. Finally, when the $f_{shaft}$ signal pulses the clocking terminal CL of flip-flop C1, the signal P5 is impressed at its terminal Q, and when the clocking signal CL2Q pulses, the signal P6 is transmitted to the NOR gate 109 and to the reset terminal of flip-flop C1.

In this manner the signals P2, P4, and P6 are fed into the NOR gate 109 and the resultant output is the waveform P7 shown in FIG. 4, which in turn is fed into the NOR gate 111. Also acting as inputs into the NOR gate 111 is a signal represented by the waveform CL of FIG. 4, and a carry out signal which is transmitted along line 113 from the counter 68. The carry out signal is normally in a low state and as such does not affect the operation of the circuit. However, when the counter is at either end of the range, i.e., maximum or minimum count, the carry out signal goes high and acts to block the operation of the NOR gate 111 (holds its output at a low state). Assuming a low state of the carry out signal, the output of NOR gate 111 is represented by the waveform P8, with each pulse representing an indicated digital signal to be either added or subtracted from the count stored in the up/down counter. The P8 signal is inverted by NOR gate 112 to provide the clock pulses to the bidirectional counter along line 67. The bidirectional counter 68a and its associated digital-to-analog converter 68b are of a known type and operate in accordance with well-known principles as set forth in copending U.S. patent application Ser. No. 432,513 entitled "Analog to Digital to Analog Rate Control Circuit for Traction Motor Control Systems" filed by Alvin L. Gardner and assigned to the assignee of the present invention. Generally, the bidirectional counter receives the clock pulses and counts up or down with each pulse that it receives, the direction of count depending on the output of NOR gate 108. For example, upon its receiving an $f_{shaft}$ pulse it counts up, and upon receiving an $f_{stator}$ pulse it counts down. The $f_{slip}$ pulses are counted either up or down depending on the up-down logic received along line 108. As mentioned hereinbefore a digital signal (high for motoring and low for braking) is transmitted along line 106 to the logic gates 107. Line 106 is grounded through a resistor 114 for protection of the logic gates comprising NOR gates 116, 117 and 118. The NOR gate 116 inverts the signal from line 106 and transmits it to NOR gate 117 with its other input signal CL2QA coming in along line 119. Output from the NOR gate 117 becomes input to NOR gate 118 along with the CL2 signal transmitted along line 1212. Output from the NOR gate 118 then becomes the up-down logic signal that is transmitted to the counter along line 108.

It may occur, as for example when the system is first started, that the limit at either end of the counter is reached. Since it can count no higher (or lower) it is necessary to temporarily lock up the system by the use of the carry out signal discussed hereinbefore. In this condition, there occurs no more counting in that direction until the proper pulses have been received to drive it in the other direction.

Output of the bidirectional counter goes to operate digital switches into resistors to convert the digital signal to representative analog voltage signals. The system is so arranged with an offset such that the analog voltage output signal is zero when the counter is in the middle of its range. From the converter 68b the analog signal passes along line 69 through resistor 122 to the function generator 71, which is basically a linear low pass filter which prevents fast correction that would otherwise override the rate limiting circuit 44. The requirement of the transfer function is to compensate the loop comprising the summing circuit 62, the counter 68, the summing circuit 59, and the converter 46, such that the total response in the loop is slower than that of the rate limiting circuit 44. As such the error signal must vary slowly in relation to changes in the $f_{shaft}$ signal. It should be kept in mind that the counter is in effect an integrator with a K/S transfer function and thus contributes to the total compensation of the loop. Also, it acts as a rate limiter since limits are imposed at each end of the counter.

The function generator 71 (FIG. 3), which has a transfer function of K/(S+W) comprises an operational amplifier 123 with an inverted input through resistor 124 and a ground resistor 126. A feedback resistor 127 and capacitor 128 are provided to set the gain of the circuit and the input line 69 is tied to ground through a capacitor 129 so that the function generator 71, in addition to compensating the loop, acts to filter out jumps in the counter positions due to the adding of slip frequency pulses (relatively low frequency) to the shaft frequency pulses (relatively high frequency). Yet the system remains sensitive to changes in the slip frequency signal because of the upper loop in FIG. 2 wherein the V slip slignal is summed with the already rate limited $f_{shaft}$ signal.

Figure 5:
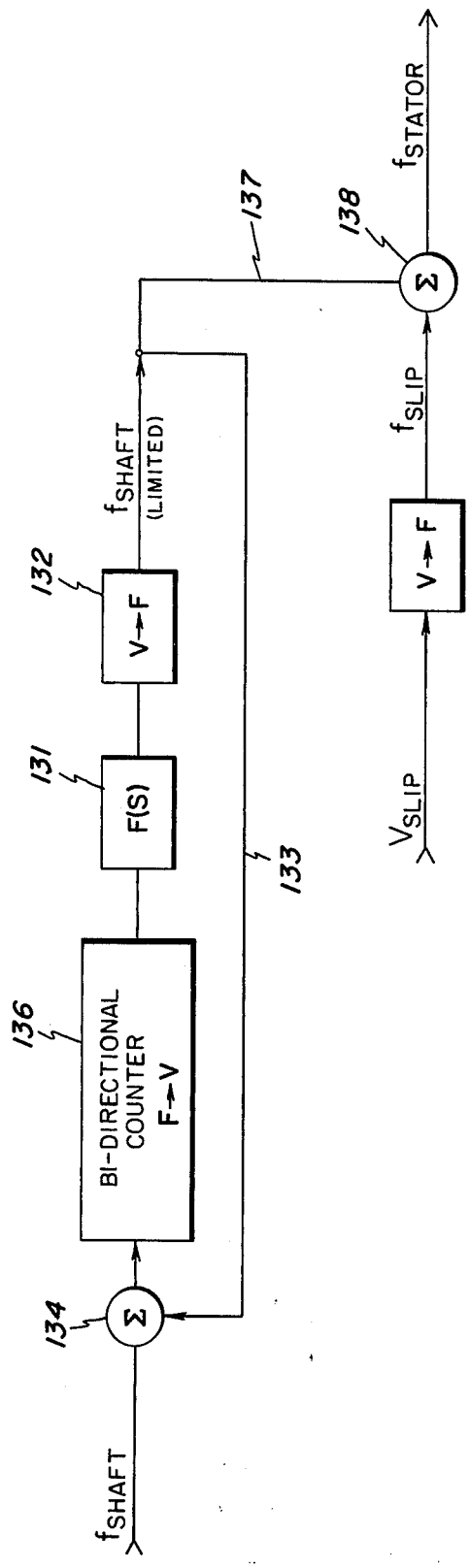
FIG. 5 is a schematic diagram of a modified embodiment of the invention.

Illustrated in FIG. 5 is a modified embodiment of the invention comprising a function generator 131 for rate limiting the shaft speed signal, a voltage to frequency converter 132, a stabilizing frequency feedback loop 133 which corrects the error, a comparator 134 which compares the rate limited $f_{shaft}$ signal with the accurate $f_{shaft}$ signal and causes the latter to follow the former, and a bidirectional counter 136 which converts the digital signals to analog signals. The counter 136 is arranged to give zero output error when there is no error or when the error has been compensated by the feedback loop 133. The transfer function $K[(S+W)/S]$ of the function generator 131 prevents the counter from having to be at the end of its range. That is, it will always sit at zero unless there is a sudden change of frequency, at which time it will temporarily hang at one end as described hereinbefore.

In this manner the slow rate of the digital signal is limited and the limited $f_{shaft}$ signal can now be transmitted along line 137 to be digitally summed with the unfiltered slPp signal $f_{slip}$ in the summer 138. It will be recognized in the modified embodiment that although the $f_{shaft}$ signal is rate limited and the slip signal $V_{slip}$ is not limited, thereby allowing sensitive response in changes thereto, the digital addition of slip without subsequent filtering tends to cause a non-uniform output in the $f_{stator}$ signal. This is true since the slip frequency $f_{slip}$ is normally much lower than that of the stator frequency $f_{stator}$ and when you add them digitally it results in the occurrence of periodic jumps in the resultant waveform.

What I claim as new and desire to secure by letters Patent of the United States is:

1. A slip control circuit for an induction motor power supply comprising:
    a. means for generating a signal representative of the shaft speed of the motor;
    b. means for filtering said shaft speed signal so as to limit the rate of change thereof, and thereby introduce an error into said filtered shaft speed signal;
    c. means for generating a signal representative of the desired slip frequency of the motor;
    d. means for summing said slip frequency signal with said filtered shaft speed signal to obtain a stator frequency signal;
    e. means for sensing the magnitude of the error introduced by the filtering of said shaft speed signal; and
    f. means for compensating said stator frequency signal by application of said error magnitude to the circuitry to obtain a compensated stator frequency to be applied to the motor power supply.

2. A slip control circuit as set forth in claim 1 wherein said error sensing means comprises a summing circuit for summing said slip frequency signal with said shaft speed signal and means for comparing the result thereof with the stator frequency signal to obtain a stator frequency error signal.

3. A slip control circuit as set forth in claim 2 wherein said compensating means comprises a summing circuit for summing the stator frequency error signal with said stator frequency signal.

4. A slip control circuit as set forth in claim 1 wherein said error sensing means comprises an up/down counter having inputs of filtered and unfiltered stator speed signals and having an output of an analog signal whose magnitude is proportional to the integral of the difference between said two inputs.

5. A slip control circuit as set forth in claim 4 wherein said compensating means comprises an up/down counter having inputs of filtered and unfiltered shaft speed signals and having an output of an analog signal whose magnitude is proportional to the integral of the difference between said two inputs.

6. A slip control circuit as set forth in claim 1 wherein said shaft speed signal is a digital signal and further wherein it is converted to an analog signal before being filtered.

7. A slip control circuit as set forth in claim 1 wherein said desired slip frequency signal is an analog signal and further wherein it is converted to a digital signal before being fed to said summing means.

8. A slip control circuit as set forth in claim 1 wherein said inaccurate stator frequency signal in an analog signal and further wherein it is converted to a digital signal for comparison with said stator frequency signal.

9. A slip control circuit as set forth in claim 1 wherein said error signal is a digital signal and further wherein it is changed to an analog signal and filtered before being summed with said stator frequency signal.

10. A slip control circuit for an induction motor power supply comprising:
    a. means for generating a signal representative of the shaft speed of the motor;
    b. means for filtering said shaft speed signal so as to limit the rate of change thereof;
    c. means for generating a signal representative of the desired slip frequency of the motor;
    d. first means for summing said slip frequency signal with said shaft speed signal to obtain an accurate stator frequency signal;
    e. second means for summing said slip frequency signal with said filtered shaft speed signal to obtain an inaccurate stator frequency signal;
    f. means for comparing said accurate stator frequency with said inaccurate stator frequency signal to obtain an error signal; and
    g. means for summing said error signal and said inaccurate stator frequency signal to obtain a corrected stator frequency signal to be applied to the motor power supply.

11. A slip control circuit as set forth in claim 10 wherein said shaft speed signal is a digital signal and further wherein it is converted to an analog signal before being filtered.

12. A slip control circuit as set forth in claim 10 wherein said desired slip frequency signal is an analog signal and further wherein it is converted to a digital signal before being fed into said first summing means.

13. A slip control circuit as set forth in claim 10 wherein said inaccurate stator frequency signal is an analog signal and further wherein it is converted to a digital signal for comparison with said accurate stator frequency signal.

14. A slip control circuit as set forth in claim 10 wherein said error signal is a digital signal and further wherein it is changed to an analog signal and filtered before being summed with said inaccurate stator frequency signal.

15. A slip control circuit for an induction motor power supply comprising:
    a. means for generating a signal representative of the shaft speed of the motor;
    b. means for filtering said shaft speed signal so as to limit the rate of change thereof, and thereby introduce an error into said filtered shaft speed signal;
    c. means for sensing the magnitude of said error and compensating said filtered shaft speed signal;
    d. means for generating a signal representative of the desired slip frequency of the motor; and e. means for summing said slip frequency signal with said compensated shaft speed signal to obtain a stator frequency signal to be applied to the motor power supply.

* * * * *